United States Patent
Heck et al.

(10) Patent No.: US 10,585,957 B2
(45) Date of Patent: *Mar. 10, 2020

(54) TASK DRIVEN USER INTENTS

(71) Applicant: Microsoft Technology Licensing LLC, Redmond, WA (US)

(72) Inventors: Larry Paul Heck, Los Altos, CA (US); Madhusudan Chinthakunta, Saratoga, CA (US); David Mitby, Mountain View, CA (US); Lisa Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,432

(22) Filed: Nov. 20, 2017

(65) Prior Publication Data

US 2018/0075151 A1 Mar. 15, 2018

Related U.S. Application Data

(63) Continuation of application No. 13/077,396, filed on Mar. 31, 2011, now Pat. No. 9,842,168.

(51) Int. Cl.
*G06F 16/95* (2019.01)
*G06F 16/9535* (2019.01)

(52) U.S. Cl.
CPC ................. *G06F 16/9535* (2019.01)

(58) Field of Classification Search
None
See application file for complete search history.

(56) References Cited

U.S. PATENT DOCUMENTS

| | | | |
|---|---|---|---|
| 4,560,977 A | 12/1985 | Murakamu |
| 4,627,620 A | 12/1986 | Yang |
| 4,630,910 A | 12/1986 | Ross et al. |
| 4,645,458 A | 2/1987 | Williams |
| 4,688,195 A | 8/1987 | Thompson |
| 4,695,953 A | 9/1987 | Blair et al. |
| 4,702,475 A | 10/1987 | Elstein et al. |
| 4,711,543 A | 12/1987 | Blair et al. |
| 4,727,354 A | 2/1988 | Lindsay |
| 4,751,642 A | 6/1988 | Silva et al. |

(Continued)

FOREIGN PATENT DOCUMENTS

| | | |
|---|---|---|
| CN | 1313972 | 9/2001 |
| CN | 1325527 | 12/2001 |

(Continued)

OTHER PUBLICATIONS

Chu-Carroll et al., "A Hybrid Approach to Natural Language Web Search," Proc of Conf on Empirical Methods in Natural Language Processing, Jul. 2002, Association for Computational Linguistics, 8 pgs.

(Continued)

*Primary Examiner* — Neeraj Sharma

(57) ABSTRACT

Identification of user intents may be provided. A plurality of network applications may be identified, and an ontology associated with each of the plurality of applications may be defined. If a phrase received from a user is associated with at least one of the defined ontologies, an action associated with the network application may be executed.

20 Claims, 3 Drawing Sheets

(56) References Cited

U.S. PATENT DOCUMENTS

| | | |
|---|---|---|
| 4,772,946 A | 9/1988 | Hammer |
| 4,796,997 A | 1/1989 | Svetkoff et al. |
| 4,809,065 A | 2/1989 | Harris et al. |
| 4,811,398 A | 3/1989 | Copperi et al. |
| 4,817,950 A | 4/1989 | Goo |
| 4,843,568 A | 6/1989 | Krueger et al. |
| 4,868,750 A | 9/1989 | Kucera et al. |
| 4,893,183 A | 1/1990 | Nayar |
| 4,901,362 A | 2/1990 | Terzian |
| 4,925,189 A | 5/1990 | Braeunig |
| 4,969,192 A | 11/1990 | Chen et al. |
| 5,101,444 A | 3/1992 | Wilson et al. |
| 5,146,406 A | 9/1992 | Jensen |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,259,766 A | 11/1993 | Sack |
| 5,265,014 A | 11/1993 | Haddock et al. |
| 5,288,078 A | 2/1994 | Capper et al. |
| 5,295,491 A | 3/1994 | Gevins |
| 5,299,125 A | 3/1994 | Baker |
| 5,320,538 A | 6/1994 | Baum |
| 5,325,298 A | 6/1994 | Gallant |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,418,948 A | 5/1995 | Turtle |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,600,765 A | 2/1997 | Ando |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,680,628 A | 10/1997 | Carus et al. |
| 5,682,196 A | 10/1997 | Freeman |
| 5,682,229 A | 10/1997 | Wangler |
| 5,690,582 A | 11/1997 | Ulrich et al. |
| 5,694,559 A | 12/1997 | Hobson et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,737,734 A | 4/1998 | Schultz |
| 5,748,974 A | 5/1998 | Johnson |
| 5,794,050 A | 8/1998 | Dahlgren et al. |
| 5,819,260 A | 10/1998 | Lu et al. |
| 5,861,886 A | 1/1999 | Moran et al. |
| 5,875,108 A | 2/1999 | Hoffberg et al. |
| 5,877,803 A | 3/1999 | Wee et al. |
| 5,880,743 A | 3/1999 | Moran et al. |
| 5,895,464 A | 4/1999 | Bhandari et al. |
| 5,913,727 A | 6/1999 | Ahdoot |
| 5,930,746 A | 7/1999 | Ting |
| 5,933,125 A | 8/1999 | Fernie et al. |
| 5,963,940 A | 10/1999 | Liddy et al. |
| 5,970,446 A | 10/1999 | Goldberg et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,111,580 A | 8/2000 | Kazama et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,212,494 B1 | 4/2001 | Boguraev |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,396 B1 | 5/2001 | Marugame |
| 6,229,913 B1 | 5/2001 | Nayar et al. |
| 6,246,981 B1 | 6/2001 | Papineni et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,327,566 B1 | 12/2001 | Vanbuskirk et al. |
| 6,345,111 B1 | 2/2002 | Yamaguchi et al. |
| 6,363,160 B1 | 3/2002 | Bradski et al. |
| 6,384,819 B1 | 5/2002 | Hunter |
| 6,397,179 B2 | 5/2002 | Crespo et al. |
| 6,401,086 B1 | 6/2002 | Bruckner |
| 6,411,725 B1 | 6/2002 | Rhoads |
| 6,411,744 B1 | 6/2002 | Edwards |
| 6,430,997 B1 | 8/2002 | French et al. |
| 6,434,520 B1 | 8/2002 | Kanevsky et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Ratii et al. |
| 6,513,063 B1 | 1/2003 | Julia et al. |
| 6,539,931 B2 | 4/2003 | Trajkovic et al. |
| 6,553,345 B1 | 4/2003 | Kuhn et al. |
| 6,570,555 B1 | 5/2003 | Prevost et al. |
| 6,601,026 B2 | 7/2003 | Appelt et al. |
| 6,633,294 B1 | 10/2003 | Rosenthal et al. |
| 6,640,202 B1 | 10/2003 | Dietz et al. |
| 6,658,377 B1 | 12/2003 | Anward et al. |
| 6,661,918 B1 | 12/2003 | Gordon et al. |
| 6,665,640 B1 | 12/2003 | Bennett et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,757,362 B1 * | 6/2004 | Cooper ................ H04M 3/527 379/88.01 |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,895,083 B1 | 5/2005 | Bers et al. |
| 6,937,742 B2 | 8/2005 | Roberts et al. |
| 6,950,534 B2 | 9/2005 | Cohen et al. |
| 6,970,947 B2 | 11/2005 | Ebling et al. |
| 6,990,639 B2 | 1/2006 | Wilson |
| 6,999,932 B1 | 2/2006 | Zhou |
| 7,003,134 B1 | 2/2006 | Covell et al. |
| 7,027,974 B1 | 4/2006 | Busch et al. |
| 7,028,269 B1 | 4/2006 | Cohen-Solal et al. |
| 7,036,094 B1 | 4/2006 | Cohen et al. |
| 7,038,855 B2 | 5/2006 | French et al. |

(56) References Cited

U.S. PATENT DOCUMENTS

| | | |
|---|---|---|
| 7,039,676 B1 | 5/2006 | Day et al. |
| 7,042,440 B2 | 5/2006 | Pryor et al. |
| 7,050,606 B2 | 5/2006 | Paul et al. |
| 7,050,977 B1 | 5/2006 | Bennett |
| 7,058,204 B2 | 6/2006 | Hildreth et al. |
| 7,060,957 B2 | 6/2006 | Lange et al. |
| 7,100,082 B2 | 8/2006 | Little |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,231,609 B2 | 6/2007 | Baudisch |
| 7,251,781 B2 | 7/2007 | Batchilo et al. |
| 7,259,747 B2 | 8/2007 | Bell |
| 7,272,601 B1 | 9/2007 | Wang et al. |
| 7,308,112 B2 | 12/2007 | Fujimura et al. |
| 7,317,836 B2 | 1/2008 | Fujimura et al. |
| 7,328,216 B2 | 2/2008 | Hofmann et al. |
| 7,348,963 B2 | 3/2008 | Bell |
| 7,359,121 B2 | 4/2008 | French et al. |
| 7,366,655 B1 | 4/2008 | Gupta |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,519,223 B2 | 4/2009 | Dehlin et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,596,767 B2 | 9/2009 | Wilson |
| 7,598,942 B2 | 10/2009 | Underkoffler et al. |
| 7,606,700 B2 | 10/2009 | Ramsey et al. |
| 7,607,509 B2 | 10/2009 | Schmiz et al. |
| 7,617,200 B2 | 11/2009 | Budzik |
| 7,620,202 B2 | 11/2009 | Fujimura et al. |
| 7,640,164 B2 | 12/2009 | Sasaki et al. |
| 7,647,228 B2 | 1/2010 | Silvera et al. |
| 7,665,041 B2 | 2/2010 | Wilson et al. |
| 7,668,340 B2 | 2/2010 | Cohen et al. |
| 7,672,845 B2 | 3/2010 | Beranek et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,716,056 B2 | 5/2010 | Weng et al. |
| 7,720,674 B2 | 5/2010 | Kaiser et al. |
| 7,720,856 B2 | 5/2010 | Godecke et al. |
| 7,729,530 B2 | 6/2010 | Antonov et al. |
| 7,746,345 B2 | 6/2010 | Hunter |
| 7,747,438 B2 | 6/2010 | Nguyen |
| 7,747,601 B2 | 6/2010 | Cooper et al. |
| 7,756,708 B2 | 7/2010 | Cohen et al. |
| 7,760,182 B2 | 7/2010 | Ahmad et al. |
| 7,797,303 B2 | 9/2010 | Roulland et al. |
| 7,809,167 B2 | 10/2010 | Bell |
| 7,822,597 B2 | 10/2010 | Brun |
| 7,834,846 B1 | 11/2010 | Bell |
| 7,852,262 B2 | 12/2010 | Namineni et al. |
| 7,869,998 B1 | 1/2011 | Di Fabbrizio |
| 7,873,532 B2 * | 1/2011 | Jones ..................... G06Q 10/06 705/7.42 |
| 7,890,500 B2 | 2/2011 | Bobrow et al. |
| 7,890,539 B2 | 2/2011 | Boschee et al. |
| 7,898,522 B2 | 3/2011 | Hildreth et al. |
| 8,000,453 B2 | 8/2011 | Cooper et al. |
| 8,019,610 B2 | 9/2011 | Walker |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,108,208 B2 | 1/2012 | Makela |
| 8,117,635 B2 | 2/2012 | Hendricks |
| 8,140,556 B2 | 3/2012 | Rao et al. |
| 8,144,840 B2 | 3/2012 | Luehrig et al. |
| 8,155,962 B2 | 4/2012 | Kennewick et al. |
| 8,165,886 B1 | 4/2012 | Gagnon |
| 8,180,629 B2 | 5/2012 | Rehberg |
| 8,260,817 B2 | 9/2012 | Boschee et al. |
| 8,265,925 B2 | 9/2012 | Aarskog |
| 8,265,939 B2 | 9/2012 | Kanevsky et al. |
| 8,317,518 B2 | 11/2012 | Jarrell |
| 8,335,754 B2 | 12/2012 | Dawson et al. |
| 8,352,245 B1 | 1/2013 | Lloyd |
| 8,355,914 B2 * | 1/2013 | Joh ..................... G10L 15/22 379/67.1 |
| 8,380,489 B1 | 2/2013 | Zhang |
| 8,433,559 B2 * | 4/2013 | Madan ............... G06F 17/2735 704/9 |
| 8,448,083 B1 | 5/2013 | Migos |
| 8,468,019 B2 | 6/2013 | Rempel |
| 8,489,115 B2 | 7/2013 | Rodriguez et al. |
| 8,521,766 B1 | 8/2013 | Hoarty |
| 8,521,786 B2 | 8/2013 | Black et al. |
| 8,595,222 B2 | 11/2013 | Dean |
| 8,595,642 B1 | 11/2013 | Lagassey |
| 8,600,747 B2 | 12/2013 | Abella et al. |
| 8,612,208 B2 | 12/2013 | Cooper et al. |
| 8,612,747 B2 | 12/2013 | Roskind |
| 8,762,358 B2 | 6/2014 | Datta et al. |
| 8,825,661 B2 | 9/2014 | Joshi et al. |
| 8,880,406 B2 * | 11/2014 | Santos-Lang ........... G10L 15/22 434/169 |
| 8,881,122 B1 | 11/2014 | Klimek et al. |
| 8,898,163 B2 | 11/2014 | Banerjee et al. |
| 9,064,006 B2 | 6/2015 | Hakkani-Tur |
| 9,064,066 B2 | 6/2015 | Kumar et al. |
| 9,082,402 B2 | 7/2015 | Yadgar |
| 9,123,341 B2 | 9/2015 | Weng et al. |
| 9,197,736 B2 | 11/2015 | Davis et al. |
| 9,244,984 B2 | 1/2016 | Heck et al. |
| 9,286,910 B1 | 3/2016 | Li et al. |
| 9,298,287 B2 | 3/2016 | Heck et al. |
| 9,318,108 B2 | 4/2016 | Gruber |
| 9,497,499 B2 * | 11/2016 | Chang ..................... H04N 7/52 |
| 9,760,566 B2 | 9/2017 | Heck et al. |
| 9,812,120 B2 * | 11/2017 | Takatsuka ............ G10L 13/027 |
| 9,842,168 B2 | 12/2017 | Heck et al. |
| 9,858,343 B2 | 1/2018 | Heck et al. |
| 10,049,667 B2 | 8/2018 | Heck et al. |
| 10,061,843 B2 | 8/2018 | Hakkani-Tur et al. |
| 2001/0020954 A1 | 9/2001 | Hull |
| 2001/0053968 A1 | 12/2001 | Galitksy |
| 2002/0059069 A1 | 5/2002 | Su et al. |
| 2002/0059289 A1 | 5/2002 | Wenegrat et al. |
| 2002/0165860 A1 | 11/2002 | Glover |
| 2003/0125955 A1 | 7/2003 | Arnold et al. |
| 2003/0130837 A1 | 7/2003 | Batchilo et al. |
| 2003/0137537 A1 | 7/2003 | Guo et al. |
| 2003/0236099 A1 | 12/2003 | Desiher et al. |
| 2004/0078725 A1 | 4/2004 | Little |
| 2004/0083092 A1 | 4/2004 | Valles |
| 2004/0117189 A1 | 6/2004 | Bennett |
| 2004/0122674 A1 | 6/2004 | Bangalore et al. |
| 2004/0172460 A1 | 9/2004 | Marel et al. |
| 2004/0189720 A1 | 9/2004 | Wilson et al. |

(56) References Cited

U.S. PATENT DOCUMENTS

| | | |
|---|---|---|
| 2004/0193420 A1 | 9/2004 | Kennewick et al. |
| 2004/0220797 A1 | 11/2004 | Wang et al. |
| 2004/0225499 A1 | 11/2004 | Wang et al. |
| 2005/0033582 A1 | 2/2005 | Gadd et al. |
| 2005/0074140 A1 | 4/2005 | Grasso et al. |
| 2005/0270293 A1 | 12/2005 | Guo et al. |
| 2005/0271864 A1 | 12/2005 | Van Driesten et al. |
| 2005/0278164 A1 | 12/2005 | Hudson et al. |
| 2005/0289124 A1 | 12/2005 | Kaiser et al. |
| 2006/0036430 A1 | 2/2006 | Hu |
| 2006/0074631 A1 | 4/2006 | Wang et al. |
| 2006/0074883 A1 | 4/2006 | Teevan et al. |
| 2006/0080101 A1 | 4/2006 | Chotimongkol et al. |
| 2006/0136375 A1 | 6/2006 | Cox |
| 2006/0173868 A1 | 8/2006 | Angele et al. |
| 2006/0206306 A1 | 9/2006 | Cao |
| 2006/0206333 A1 | 9/2006 | Paek et al. |
| 2006/0206336 A1 | 9/2006 | Gurram et al. |
| 2006/0206454 A1 | 9/2006 | Forstall et al. |
| 2006/0224569 A1 | 10/2006 | Desanto et al. |
| 2006/0235689 A1 | 10/2006 | Sugihara |
| 2006/0259302 A1 | 11/2006 | Lewis et al. |
| 2006/0271353 A1 | 11/2006 | Berkan |
| 2006/0271356 A1 | 11/2006 | Vos |
| 2006/0271520 A1 | 11/2006 | Ragan |
| 2006/0293874 A1 | 12/2006 | Zhang et al. |
| 2007/0005363 A1 | 1/2007 | Cucerzan et al. |
| 2007/0038436 A1 | 2/2007 | Cristo et al. |
| 2007/0047719 A1* | 3/2007 | Dhawan .............. H04M 1/2478 |
| | | 379/235 |
| 2007/0055508 A1 | 3/2007 | Zhao et al. |
| 2007/0071209 A1 | 3/2007 | Horvitz |
| 2007/0100624 A1 | 5/2007 | Weng et al. |
| 2007/0106497 A1 | 5/2007 | Ramsey et al. |
| 2007/0118357 A1 | 5/2007 | Kasravi et al. |
| 2007/0124134 A1 | 5/2007 | Van Kommer |
| 2007/0124263 A1 | 5/2007 | Katariya et al. |
| 2007/0136068 A1 | 6/2007 | Horvitz |
| 2007/0136222 A1 | 6/2007 | Horvitz |
| 2007/0143155 A1 | 6/2007 | Whitsett et al. |
| 2007/0174343 A1 | 7/2007 | Fortuna |
| 2007/0299798 A1 | 12/2007 | Suyama et al. |
| 2007/0299799 A1 | 12/2007 | Meehan et al. |
| 2008/0005068 A1 | 1/2008 | Dumais |
| 2008/0026838 A1 | 1/2008 | Dunstan et al. |
| 2008/0040114 A1 | 2/2008 | Zhou et al. |
| 2008/0040510 A1 | 2/2008 | Warner et al. |
| 2008/0080678 A1 | 4/2008 | Ma et al. |
| 2008/0082518 A1 | 4/2008 | Loftesness |
| 2008/0097951 A1 | 4/2008 | Gupta |
| 2008/0140389 A1 | 6/2008 | Funakoshi |
| 2008/0140657 A1 | 6/2008 | Azvine et al. |
| 2008/0152191 A1 | 6/2008 | Fujimura et al. |
| 2008/0167876 A1 | 7/2008 | Bakis |
| 2008/0168037 A1 | 7/2008 | Kapadia et al. |
| 2008/0172359 A1 | 7/2008 | Lundell et al. |
| 2008/0201280 A1 | 8/2008 | Martin et al. |
| 2008/0201434 A1 | 8/2008 | Holmes et al. |
| 2008/0221870 A1 | 9/2008 | Attardi et al. |
| 2008/0228467 A1 | 9/2008 | Womack et al. |
| 2008/0231926 A1 | 9/2008 | Klug et al. |
| 2008/0235199 A1 | 9/2008 | Li et al. |
| 2008/0294628 A1* | 11/2008 | Shoval .............. G06F 16/337 |
| 2008/0300871 A1 | 12/2008 | Gilbert |
| 2008/0306934 A1 | 12/2008 | Craswell et al. |
| 2008/0319944 A1 | 12/2008 | Venolia |
| 2008/0319962 A1 | 12/2008 | Riezler et al. |
| 2009/0006333 A1 | 1/2009 | Jones et al. |
| 2009/0006345 A1 | 1/2009 | Platt et al. |
| 2009/0006389 A1 | 1/2009 | Piscitello et al. |
| 2009/0008398 A1 | 1/2009 | Nakatsuji et al. |
| 2009/0012778 A1 | 1/2009 | Feng |
| 2009/0012842 A1 | 1/2009 | Srinivasan et al. |
| 2009/0027337 A1 | 1/2009 | Hildreth |
| 2009/0055380 A1 | 2/2009 | Peng |
| 2009/0076917 A1 | 3/2009 | Jablokov et al. |
| 2009/0077047 A1 | 3/2009 | Cooper et al. |
| 2009/0079813 A1 | 3/2009 | Hildreth |
| 2009/0089126 A1 | 4/2009 | Odubiyi |
| 2009/0089128 A1 | 4/2009 | Tkatch et al. |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0119587 A1 | 5/2009 | Allen et al. |
| 2009/0135740 A1 | 5/2009 | Dhara et al. |
| 2009/0141933 A1 | 6/2009 | Wagg |
| 2009/0164441 A1 | 6/2009 | Cheyer |
| 2009/0177645 A1 | 7/2009 | Heck |
| 2009/0187402 A1 | 7/2009 | Scholl |
| 2009/0221368 A1 | 9/2009 | Yen et al. |
| 2009/0232288 A1 | 9/2009 | Forbes et al. |
| 2009/0234655 A1 | 9/2009 | Kwon |
| 2009/0248422 A1 | 10/2009 | Li et al. |
| 2009/0248659 A1 | 10/2009 | McCool et al. |
| 2009/0281789 A1 | 11/2009 | Waibel et al. |
| 2009/0292687 A1 | 11/2009 | Fan et al. |
| 2009/0315740 A1 | 12/2009 | Hildreth et al. |
| 2009/0327889 A1 | 12/2009 | Jeong et al. |
| 2010/0023320 A1 | 1/2010 | DiCristo et al. |
| 2010/0023331 A1 | 1/2010 | Duta et al. |
| 2010/0036717 A1 | 2/2010 | Trest |
| 2010/0036831 A1 | 2/2010 | Vemuri |
| 2010/0057463 A1 | 3/2010 | Weng et al. |
| 2010/0057801 A1 | 3/2010 | Ramer et al. |
| 2010/0070517 A1 | 3/2010 | Ghosh et al. |
| 2010/0082610 A1 | 4/2010 | Anick |
| 2010/0093435 A1 | 4/2010 | Glaser et al. |
| 2010/0095206 A1 | 4/2010 | Kim |
| 2010/0112189 A1 | 5/2010 | Yu |
| 2010/0114574 A1 | 5/2010 | Liu et al. |
| 2010/0121839 A1 | 5/2010 | Meyer |
| 2010/0138215 A1 | 6/2010 | Williams |
| 2010/0138410 A1 | 6/2010 | Liu |
| 2010/0161642 A1 | 6/2010 | Chen |
| 2010/0169098 A1 | 7/2010 | Patch |
| 2010/0199227 A1 | 8/2010 | Xiao et al. |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1 | 9/2010 | Bruno |
| 2010/0274796 A1 | 10/2010 | Beauregard et al. |
| 2010/0281435 A1 | 11/2010 | Bangalore et al. |
| 2010/0306591 A1 | 12/2010 | Krishna |
| 2010/0312779 A1* | 12/2010 | Lim .............. G06Q 10/10 |
| | | 707/759 |
| 2010/0313125 A1 | 12/2010 | Fleizach |
| 2010/0313398 A1 | 12/2010 | Brun et al. |
| 2010/0318549 A1 | 12/2010 | Mayr |
| 2011/0010367 A1* | 1/2011 | Jockish .............. G06F 16/334 |
| | | 707/733 |
| 2011/0016005 A1 | 1/2011 | Li et al. |
| 2011/0022992 A1 | 1/2011 | Zhou et al. |
| 2011/0040777 A1 | 2/2011 | Stefanov |
| 2011/0047149 A1* | 2/2011 | Vaananen .......... G06F 16/9537 |
| | | 707/723 |
| 2011/0063301 A1* | 3/2011 | Setlur .............. G09B 29/007 |
| | | 345/441 |
| 2011/0078159 A1 | 3/2011 | Li et al. |
| 2011/0082848 A1 | 4/2011 | Goldentouch |
| 2011/0087670 A1* | 4/2011 | Jorstad .............. G06F 17/277 |
| | | 707/741 |
| 2011/0099476 A1 | 4/2011 | Snook et al. |
| 2011/0105190 A1 | 5/2011 | Cha |
| 2011/0137943 A1 | 6/2011 | Asano |
| 2011/0144999 A1 | 6/2011 | Jang et al. |
| 2011/0208800 A1* | 8/2011 | Nicks .............. G06F 16/90335 |
| | | 709/203 |
| 2011/0219340 A1 | 9/2011 | Pathangay |
| 2011/0238410 A1 | 9/2011 | Larcheveque et al. |
| 2011/0313768 A1 | 12/2011 | Klein et al. |
| 2011/0320470 A1 | 12/2011 | Williams et al. |
| 2011/0320945 A1 | 12/2011 | Wong |

(56) References Cited

U.S. PATENT DOCUMENTS

| | | | |
|---|---|---|---|
| 2012/0016678 A1* | 1/2012 | Gruber | G10L 15/22 704/275 |
| 2012/0030637 A1 | 2/2012 | Day et al. | |
| 2012/0035924 A1 | 2/2012 | Jitkoff et al. | |
| 2012/0059842 A1 | 3/2012 | Hille-Doering et al. | |
| 2012/0078636 A1 | 3/2012 | Ferrucci | |
| 2012/0082353 A1 | 4/2012 | Kelusky et al. | |
| 2012/0130822 A1 | 5/2012 | Patwa et al. | |
| 2012/0131073 A1 | 5/2012 | Olney | |
| 2012/0136865 A1 | 5/2012 | Blom et al. | |
| 2012/0166178 A1 | 6/2012 | Latzina | |
| 2012/0197999 A1 | 8/2012 | Agarwal et al. | |
| 2012/0216151 A1 | 8/2012 | Sarkar | |
| 2012/0233207 A1 | 9/2012 | Mohajer | |
| 2012/0242586 A1 | 9/2012 | Krishnaswamy | |
| 2012/0253788 A1 | 10/2012 | Heck et al. | |
| 2012/0253789 A1 | 10/2012 | Heck et al. | |
| 2012/0253790 A1 | 10/2012 | Heck et al. | |
| 2012/0253791 A1 | 10/2012 | Heck et al. | |
| 2012/0253793 A1 | 10/2012 | Ghannam et al. | |
| 2012/0253802 A1 | 10/2012 | Heck et al. | |
| 2012/0254227 A1 | 10/2012 | Heck et al. | |
| 2012/0254810 A1 | 10/2012 | Heck et al. | |
| 2012/0290290 A1 | 11/2012 | Tur et al. | |
| 2012/0296643 A1 | 11/2012 | Kristjansson et al. | |
| 2012/0316862 A1 | 12/2012 | Sultan et al. | |
| 2012/0327009 A1 | 12/2012 | Fleizach | |
| 2013/0013644 A1 | 1/2013 | Sathish et al. | |
| 2013/0080472 A1 | 3/2013 | Cohen et al. | |
| 2013/0117022 A1 | 5/2013 | Chen et al. | |
| 2013/0185081 A1 | 7/2013 | Cheyer et al. | |
| 2013/0241834 A1 | 9/2013 | Vennelakanti et al. | |
| 2013/0273976 A1 | 10/2013 | Rao et al. | |
| 2014/0006012 A1 | 1/2014 | Zhou et al. | |
| 2014/0059030 A1 | 2/2014 | Hakkani-Tur | |
| 2014/0074629 A1* | 3/2014 | Rathod | G06Q 10/10 705/14.73 |
| 2015/0127323 A1 | 5/2015 | Jacquet | |
| 2015/0356418 A1 | 12/2015 | Yampolska et al. | |
| 2016/0004707 A1 | 1/2016 | Hakkani-Tur | |
| 2016/0118046 A1 | 4/2016 | Heck et al. | |
| 2016/0140228 A1 | 5/2016 | Cohen et al. | |
| 2016/0179807 A1 | 6/2016 | Kumar et al. | |
| 2017/0011025 A1 | 1/2017 | Tur et al. | |
| 2017/0038097 A1 | 2/2017 | Ni et al. | |
| 2017/0075985 A1 | 3/2017 | Chakraborty et al. | |
| 2018/0075151 A1 | 3/2018 | Heck et al. | |

FOREIGN PATENT DOCUMENTS

| | | |
|---|---|---|
| CN | 1692407 | 11/2005 |
| CN | 1963752 | 10/2006 |
| CN | 1845052 | 5/2007 |
| CN | 1983271 | 6/2007 |
| CN | 101120341 | 2/2008 |
| CN | 101297355 | 10/2008 |
| CN | 101254344 B | 6/2010 |
| CN | 101499277 | 5/2011 |
| EP | 357909 A1 | 3/1990 |
| EP | 583061 A2 | 2/1994 |
| EP | 919906 A2 | 6/1999 |
| EP | 1793318 | 6/2007 |
| EP | 1335338 A3 | 12/2007 |
| EP | 2122542 A1 | 11/2009 |
| JP | H0844490 A | 2/1996 |
| JP | 08-235185 | 9/1996 |
| JP | 2001022779 | 1/2001 |
| JP | 2001-125592 | 5/2001 |
| JP | 2001125896 | 5/2001 |
| JP | 2002-024285 | 1/2002 |
| JP | 2002-082748 | 3/2002 |
| JP | 2003-505712 | 2/2003 |
| JP | 2003-115951 | 4/2003 |
| JP | 2004212641 | 7/2004 |
| JP | 2004328181 | 11/2004 |
| JP | 2004-341672 | 12/2004 |
| JP | 2005-043461 | 2/2005 |
| JP | 2006-202159 | 8/2006 |
| JP | 2009116733 | 5/2009 |
| JP | 2009-205552 | 9/2009 |
| JP | 2010-128665 | 6/2010 |
| JP | 2010-519609 | 6/2010 |
| JP | 2010-145262 | 7/2010 |
| JP | 2010-230918 | 10/2010 |
| JP | 2010538375 A | 12/2010 |
| KR | 1020050032649 | 4/2005 |
| KR | 10-1007336 | 1/2011 |
| KR | 10-2011-0066357 | 6/2011 |
| TW | 504624 | 10/2002 |
| WO | 9310708 A1 | 6/1993 |
| WO | 9519031 A1 | 7/1995 |
| WO | 9717598 A1 | 5/1997 |
| WO | 9803907 A2 | 1/1998 |
| WO | 9942920 A1 | 8/1999 |
| WO | 9944698 A2 | 9/1999 |
| WO | 2000/73900 | 12/2000 |
| WO | 2000/75808 | 12/2000 |
| WO | 0073995 A2 | 12/2000 |
| WO | 2006042028 | 6/2006 |
| WO | 2007/064482 | 6/2007 |
| WO | 2008/049206 | 5/2008 |
| WO | 2008069519 A1 | 6/2008 |
| WO | 2008100690 A1 | 8/2008 |
| WO | 2009029905 | 5/2009 |
| WO | 2009059065 A1 | 5/2009 |
| WO | 2012135210 A2 | 10/2012 |

OTHER PUBLICATIONS

Di Buccio Emanuele et al., "Detecting verbose queries and improving information retrieval," Information Processing & Management, vol. 50, No. 2, Oct. 28, 2013, 19 pgs.

Goodwin, "Which Search Engine Would be a Jeopardy Champion?" retrieved Apr. 12, 2012 from http://searchenginewatch.com/article/2050114/which-search-engine-would-be-a-jeopardy-champion, Jan. 2011, 2 pgs.

Gupta et al., "Information Retrieval with Verbose Queries", Foundations and Trends in Information Retrieval, vol. 9, No. 3-4, Jul. 31, 2015, pp. 209-354.

Huston et al., "Evaluating verbose query processing techniques", Proceedings of the 33rd International ACM Sigir Conference on Research and Development in Information Retrieval, Sigir '10, ACM Press, New York, New York, Jul. 19, 2010, pp. 291-298.

Molla et al., "AnswerFinder at TREC 2004," In Proceedings of the Thirteenth Text Retrieval Conference, TREC, Nov. 16, 2004, 9 pgs.

PCT International Search Report in PCT/US2013/049085, dated Nov. 7, 2013, 8 pgs.

PCT International Search Report in PCT/US2016/050840, dated Dec. 6, 2016, 12 pgs.

U.S. Appl. No. 13/539,674, Office Action dated Mar. 17, 2015, 12 pgs.

U.S. Appl. No. 13/539,674, Office Action dated Oct. 27, 2015, 15 pgs.

Wang et al., "Web-Based Unsupervised Learning for Query Formation in Question Answering", Proc 2nd Intl Joint Conf on Natural Language Processing, Oct. 2005, 12 pgs.

U.S. Appl. No. 13/077,303, Advisory Action dated Feb. 2, 2017, 3 pgs.

Chinese Office Action in Application 201210087420.9, dated Jan. 12, 2017, 5 pgs.

Japanese Notice of Allowance in Application 2014-502723, dated Jan. 4, 2017, 3 pgs. (No English Translation.).

U.S. Appl. No. 13/077,431, Office Action dated Feb. 3, 2017, 16 pgs.

Chinese Office Action in Application 201210091176.3, dated Dec. 21, 2016, 9 pgs.

Japanese Office Action in Application 2014502721, dated Nov. 22, 2016, 4 pgs.

(56) References Cited

OTHER PUBLICATIONS

U.S. Appl. No. 13/077,396, Office Action dated Jan. 27, 2017, 36 pgs.
U.S. Appl. No. 13/076,862, Notice of Allowance dated Dec. 1, 2016, 16 pgs.
Chinese 2nd Office Action in Application 201210092263.0, dated Aug. 16, 2016, 5 pgs.
Chinese 2nd Office Action in Application 201210101485.4, dated Aug. 16, 2016, 5 pgs.
U.S. Appl. No. 13/077,233, Office Action dated Nov. 10, 2016, 41 pgs.
U.S. Appl. No. 13/106,374, Notice of Allowance dated Aug. 4, 2016, 2 pgs.
U.S. Appl. No. 13/077,303, Office Action dated Oct. 26, 2016, 16 pgs.
Chinese Office Action in Application 201210090634.1, dated Jun. 30, 2016, 10 pgs.
U.S. Appl. No. 13/077,431, Office Action dated Jun. 29, 2016, 16 pgs.
U.S. Appl. No. 14/733,188, Office Action dated Oct. 25, 2016, 16 pgs.
A. Celikyilmaz, D. Hakkani-Tür, and G. Tur, "Approximate Interference for Domain Detection in Spoken Language Understanding," in Proceedings of Interspeech, Florence, Italy, 2011.
Abela, et al., abstract entitled "SemChat: Extracting Personal Information from Chat Conversations," Retrieved Date: Oct. 12, 2010. http://staff.um.edu.mt/cabe2/supervising/undergraduate/overview/keith_cortis.pdf, 10 pgs.
Abstract entitled "Adding Intelligence to the Interface," Published Date: 1996 IEEE. http://www.hitl.washington.edu/publications/billinghurst/vrais96/, 12 pgs.
Agichtein, et al., "Improving Web Search Ranking by Incorporating User Behavior Information", In Proceedings of the 29th Annual International ACM SIGIR Conference on Research and Development in Information Retrieval, Aug. 6, 2006, 8 pgs.
Antoine, et al., Abstract entitled "Automatic Adaptive Understanding of Spoken Language by Cooperation of Syntactic Parsing and Semantic Priming"—Published Date: 1994. Obtained at: http://www-clips.imag.fr/geod/User/jean.caelen/Publis_fichiers/SyntaxeSemantique.pdf, 5 pgs.
Aye, et al., article entitled "Use of Ontologies for Bridging Semantic Gaps in Distant Communication," Published Date: 2008. http://ieeexplore.ieee.org/stamp/stamp.jsp?tp=&arnumber=4781725, 5 pgs.
Castells, et al., article entitled "Scalable semantic personalized search of spoken and written contents on the Semantic Web,A" Published Date: 2005. http://webcache.googleusercontent.com/search?q=cache:http://ir.ii.uam.es/s5t/informes/TIN2005-06885.pdf, 12 pgs.
Chinese Office Action and Search Report Issued in Patent Application No. 201210092263.0, dated Dec. 10, 2015, 15 pgs.
Chinese Office Action and Search Report Issued in Patent Application No. 201210101485.4, dated Dec. 11, 2015, 14 pgs.
Chinese Office Action in Application 201210087420.9, dated May 5, 2016, 18 pgs.
Chinese Office Action in Application 201210090349.X, dated Jun. 15, 2016, 13 pgs.
Chinese Office Action in Application 2012100911763, dated May 25, 2016, 14 pgs.
Chinese Office Action in Application 201210093414.4, dated Jun. 3, 2016, 16 pgs.
Cozzolongo, et al., "Personalized Control of Smart Environments", In Lecture Notes in Computer Science, vol. 4511, Jul. 25, 2007, 5 pgs (cited in May 28, 2015 EP ISR).
D. Hakkani-Tür, G. Tur, L. Heck, and E. Shriberg, "Bootstrapping Domain Detection Using Query Click Logs for New Domains," in Proceedings of Interspeech, Florence, Italy, 2011.
D. Hillard, A. Celikyilmaz, D. Hakkani-Tür, and G. Tur, "Learning Weighted Entity Lists from Web Click Logs for Spoken Language Understanding," in Proceedings of Interspeech, Florence, Italy, 2011.

Diaz et al., "CO-Pretégé: A Groupware Tool for Supporting Collaborative Ontology Design with Divergence"; alicia.diaz@sol.info.unlp.edu.ar; Jul. 18, 2005; [retrieved Mar. 26, 2015]; 4 pgs. (cited in Apr. 20, 2015 EP Comm).
Dowding, et al. Article entitled "Gemini: A Natural Language System for Spoken Language Understanding" pp. 54-61.Obtained on May 12, 2011 at website: http://ac1.1dc.upenn.edu/P/P93/P93-1008.pdf , 8 pgs.
EP Communication dated Apr. 20, 2015 in Application No. PCT/US2012/030636, 8 pgs.
EP Extended Search Report Received for European Patent Application No. 12763913.6, dated Sep. 1, 2015, 13 pgs.
EP Search Report Issued in European Patent Application No. PCT/US2012/030730, dated May 11, 2015, 9 pgs.
EP Search Report Received for European Patent Application No. 12765896.1, dated May 28, 2015, 12 pgs.
EP Supplementary Search Report Issued in European Patent Application No. PCT/US2012/031722, dated May 11, 2015, 11 pgs.
EP Supplementary Search Report Received for European Patent Application No. PCT/US2012/031736, dated May 11, 2015, 10 pgs.
Fabbrizio et al., abstract entitled "Bootstrapping Spoken Dialog Systems with Data Reuse," Retrieved Date: Oct. 12, 2010. http://www.sigdial.org/workshops/workshop5/proceedings/pdf/difabbrizio.pdf, 9 pgs.
Finkel, et al., Abstract entitled "Incorporating Non-Local Information into Information Extraction Systems by Gibbs Sampling"—Published Date: Jan. 3, 2006. Obtained at: http://nlp.stanford.edu/~manning/papers/gibbscrf3.pdf,8 pgs.
G. Tur and R. D. Mori, Eds., Spoken Language Understanding: Systems for Extracting Semantic Information from Speech. New York, NY: John Wiley and Sons, 2011, 484 pgs.
Gillick, et al. Article entitled "Some Statistical Issues in the Comparison of Speech Recognition Algorithms." Published in the Proceedings at the IEEE Conference on Acoustics, Speech and Sig. Proc., Glasglow, 1989; pp. 532-535. http://citeseerx.ist.psu.edu/viewdoc/download?doi=10.1.1.162.2233&rep=rep1&type=pdf, 4 pgs.
Gorin, et al., Abstract entitled "How May I Help You?" Published in Speech Communication 23, Feb. 14, 1997, Revised May 23, 1997; pp. 113-127. http://disi.unitn.it/~riccardi/papers/specom97.pdf, 14 pgs.
Haffner, et al., "Optimizing SVMS for Complex Call Classification", In Proceedings of IEEE International Conference on Acoustics, Speech, and Signal Processing, Apr. 6, 2003, 4 pgs.
Hakkani-Tur, et al. Abstract entitled "Using Semantic and Syntactic Graphs for Call Classification" Published in the Proceedings of the ACL Workshop on Feature Engineering for Machine Learingin in NLP, pp. 24-31 in Ann Arbor, Michigan, Jun. 2005. Obtained at: http://citeseerx.ist.psu.edu/viewdoc/download?doi=10.1.1.59.8566&rep=rep1&type=pdf,8 pgs.
Hakkani-Tur, et al., "Employing Web Search Query Click Logs for Multi-Domain Spoken Language Understanding", In Proceedings of IEEE Workshop on Automatic Speech Recognition and Understanding, Dec. 11, 2011, 6 pgs.
Hakkani-Tur, et al., "Exploiting Query Click Logs for Utterance Domain Detection in Spoken Language Understanding", In Proceedings of International Conference on Acoustics, Speech and Signal Processing, May 22, 2011, 4 pgs.
Hakkani-Tur, et al., "Mining Search Query Logs for Spoken Language Understanding", In Workshop on Future Directions and Needs in the Spoken Dialog Community: Tools and Data, Jun. 7, 2012, pp. 37-40.
He, et al. Abstract entitled "A Data-Driven Spoken Language Understanding System." Obtained on May 12, 2011 at website: http://citeseerxist.psu.edu/viewdoc/download?doi=10.1.1.141.5688&rep=rep1&type=pdf, 6 pgs.
Horiguchi et al., abstract entitled "GaChat: A chat system that displays online retrieval information in dialogue text," Published at the Workshop on Visual Interfaces to the Social and the Semantic Web Conference Feb. 8, 2009 in Sanibel Island, Florida. http://www.smart-ui.org/events/vissw2009/papers/VISSW2009-Horiguchi.pdf, 5 pgs.

(56) References Cited

OTHER PUBLICATIONS

Hu, et al., "SmartContext: An Ontology Based Context Model for Cooperative Mobile Learning", In Computer Supported Cooperative Work in Design III, May 3, 2006, pp. 717-726 (cited in May 11, 2015 EP Supp ISR).
International Search Report & Written Opinion in PCT/US2012/030636 dated Oct. 31, 2012, 12 pgs.
International Search Report & Written Opinion in PCT/US2012/030730 dated Oct. 30, 2012, 10 pgs.
International Search Report & Written Opinion in PCT/US2012/030740 dated Nov. 1, 2012, 12 pgs.
International Search Report & Written Opinion in PCT/US2012/030751 dated Sep. 5, 2012, 9 pgs.
International Search Report & Written Opinion in PCT/US2012/030757 dated Nov. 1, 2012, 10 pgs.
International Search Report & Written Opinion in PCT/US2012/031722 dated Oct. 23, 2012, 11 pgs.
International Search Report & Written Opinion in PCT/US2012/031736 dated Oct. 31, 2012, 12 pgs.
International Search Report & Written Opinion in PCT/US2013/055232, dated Nov. 18, 2013, 10 pgs.
Japanese Office Action in Application 2014-502718, dated May 26, 2016, 9 pgs.
Japanese Office Action in Application 2014-502721, dated Mar. 3, 2016, 10 pgs.
Japanese Office Action in Application 2014-502723, dated Apr. 27, 2016, 7 pgs.
Jebara et al., article entitled "Tracking Conversational Context for Machine Mediation of Human Discourse," Retrieved Date: Oct. 1, 2010. http://www.cs.columbia.edu/~jebara/papers/conversation.pdf, 3 pgs.
Jeong, et al., Abstract entitled "Exploiting Non-Local Features for Spoken Language Understanding" Published in the Proceedings of the COLING/ACL 2006 Main Conference Poster Sessions, pp. 412-419 in Sydney, Australia Jul. 2006. Obtain copy at: http://www.aclweb.org/anthology/P/P06/P06-2054.pdf, 8 pgs.
Jung, J. Jason, "Ontology-based context Synchronization for an ad hoc social collaborations," Knowledge-Based Systems, vol. 21, 2008, pp. 573-580.
Klusch; "Information Agent Technology for the Internet: A Survey"; Data & Knowledge Engineering; vol. 36, Mar. 1, 2001, 36 pgs. (cited in Sep. 1, 2015 ISR).
Koehn, et al., "Moses: Open Source Toolkit for Statistical Machine Translation", In Proceedings of the Annual Meeting of the Association for Computational Linguistics, Demonstration and Poster Session, Jun. 2007, 4 pgs.
Kok, et al., "Hitting the Right Paraphrases in Good Time", In Proceedings of Human Language Technologies: The Annual Conference of the North American Chapter of the Association for Computational Linguistics, Jun. 2010, 9 pgs.
Kolski et al., "A Review of Intelligent Human-Machine Interfaces in the Light of the ARCH Model"; Published online Nov. 13, 2009; International Journal of Human-Computer Interaction; vol. 10, No. 3; Sep. 1, 1998 (cited in Sep. 1, 2015 ISR).
Kuansan Wang, Abstract entitled "Semantics Synchronous Understanding for Robust Spoken Language Applications"—Published Date: 2003, pp. 640-645. Obtained at: http://research.microsoft.com/pubs/77494/2003-kuansan-asru.pdf, 6 pgs.
Lee e al., article entitled "An Implementation of Multi-Modal Game Interface Based on PDAs," Published Date: Aug. 2007 at the IEEE Fifth International Conference on Software Engineering Research, Management and Applications. http://ieeexplore.ieee.org/stamp/stamp.jsp?tp=&arnumber=4297013, 8 pgs.
Lee, et al. Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72. Obtained at: http://www.mt-archive.info/AMTA-1997-Lee.pdf, 2 pgs.
Lyons, et al., article entitled "Augmenting Conversations Using Dual-Purpose Speech,"—Published Date: 2004; College of Computing and GVU Center, Georgia Institute of Technology, Atlanta, Georgia, http://www.cc.gatech.edu/ccg/publications/dp-uist.pdf,10 pgs.
Mairesse, et al., article entitled Learning to Personalize Spoken Generation for Dialogue Systems—Published Date: 2005.http://citeseerxist.psu.edu/viewdoc/download?doi=10.1.1.66.9988&rep=rep1&type =pdf, 4 pgs.
Marcialis, et al., article entitled "SEARCHY: An Agent to Personalize Search Results," Published Date: Jun. 20, 2008 at the IEEE Third International Conference on Internet and Web Applications and Services Conference. http://ieeexplore.ieee.org/stamp/stamp.jsp?tp=&arnumber=4545664, 6 pgs.
Mark Billinghurst, article entitled "Put That Where? Voice and Gesture at the Graphics Interface," Published in the Nov. 1998 Computer Graphics. http://delivery.acm.org/10.1145/310000/307730/p60-billinghurst.pdf?key1=307730&key2=0278375821&coll=GUIDE&dl=GUIDE&CFID=103683245&CFTOKEN=90378528, 5 pgs.
Mittal, et al., "A Hybrid Approach of Personalized Web Information Retrieval." Proceedings of the 2010 IEEE/WIC/ACM International Conference on Web Intelligence and Intelligent Agent Technology, Aug. 31, 2010, vol. 1, pp. 308-313.
Moschitti, et al., Abstract entitled "Spoken Language Understanding with Kernels for Syntactic/Semantic Structures" Published in the 2007 IEEE Proceedings, pp. 183-188. Obtained at: http://ieeexplore.ieee.org/stamp/stamp.jsp?tp=&arnumber=4430106,6 pgs.
Moustakas et al., article entitled "Master-Piece: A Multimodal (Gesture+Speech) Interface for 3D Model Search and Retrieval Integrated in a Virtual Assembly Application," Presented and Published Jul. 18-Aug. 12, 2005 at Enterface '05 in Mons, Belgium. http://www.enterface.net/enterface05/docs/results/reports/project7.pdf, 14 pgs.
Mylonas et al., article entitled "Personalized information retrieval based on context and ontological knowledge," Retrieved Date: Sep. 30, 2010. Printed in the United Kingdom and Presented in the Knowledge Engineering Review, vol. 23:1, 73-100; 2007, Cambridge University Press. http://citeseerx.ist.psu.edu/viewdoc/download?doi=10.1.1.148.4272&rep=rep1&type=pdf, 28 pgs.
Nguyen, et al., article entitled "An Adaptive Plan Based Dialogue Agent: Integrating Learning into a BDI Architecture," Published Date: May 8-12 2006 at AAMASA '06 in Hakodate, Hokkaido, Japan. http://www.cse.unsw.edu.au/~wobcke/papers/adaptive-dialogue.pdf,3 pgs.
Nijholt, et al., "Google Home: Experience, Support and Re-Experience of Social Home Activities", In Information Sciences, vol. 178, Issue 3, Nov. 6, 2007, 19 pgs (cited in May 28, 2015 EP ISR).
Notice of Allowance dated Dec. 18, 2015, in U.S. Appl. No. 13/077,455, 2 pgs.
Notice of Allowance dated Dec. 3, 2014 in U.S. Appl. No. 13/592,638, 8 pgs.
Notice of Allowance dated Dec. 3, 2015, in U.S. Appl. No. 13/077,455, 2 pgs.
Notice of Allowance dated Feb. 17, 2015 in U.S. Appl. No. 13/592,638, 8 pgs.
Notice of Allowance dated Oct. 7, 2015, in U.S. Appl. No. 13/077,368, 15 pgs.
Notice of Allowance dated Sep. 18, 2015, in U.S. Appl. No. 13/077,455, 7 pgs.
Och, et al., "A Systematic Comparison of Various Statistical Alignment Models", In Journal of Computational Linguistics, vol. 29, Issue 1, Mar. 2003, 33 pgs.
P. J. Price, Abstract entitled "Evaluation of Spoken Language Systems: The ATIS Domain" Obtained on May 12, 2011, 5 pgs. from the following website: http://acl.ldc.upenn.edu/H/H90/H90-1020.pdf.
Panton et al., "Common Sense Reasoning—From Cyc to Intelligent Assistant"; Cycorp, Inc.; Jan. 1, 2006; Ambient Intelligence in Everyday Life Lecture Notes in Computer Science; 32 pgs. (cited in Sep. 1, 2015 ISR).
Petrov et al., Abstract entitled "Learning and Inference for Hierarchically Split PCFGs" Published in 2007 in cooperation with the Association for the Advancement of Artificial Intelligence. Obtained at: http://www.petrovi.de/data/aaai07.pdf, 4 pgs.

(56) References Cited

OTHER PUBLICATIONS

Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 pgs (cited in May 28, 2015 EP ISR).
Power Point Presentation entitled "Spoken Language Understanding for Conversational Dialog Systems," Presented and published at the IEEE/ACL 2006 Workshop on Spoken Language Technology in Aruba, Dec. 10-13, 2006. http://www.slt2006.org/MichaelMcTear.ppt, 33 pgs.
Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608.Obtain at: http://citeseerxist.psu.edu/viewdoc/download?doi=10.1.1.106.2105&rep=rep1&type=pdf, 4 pgs.
Richard A. Bolt, "Put-That-There: Voice and Gesture at the Graphics Interface", Architecture Machine Group, MIT, 1980, 9 pgs.
Riezler, et al., "Query Rewriting Using Monolingual Statistical Machine Translation", In Journal of Computational Linguistics Archive, vol. 36, Issue 3, Sep. 2010, pp. 569-582.
Robert Brown, article entitled "Exploring New Speech Recognition and Synthesis APIs in Windows Vista," published in MSDN Magazine, Retrieved Date: Oct. 12, 2010. http://msdn.microsoft.com/en-us/magazine/cc163663.aspx, 11 pgs.
Schapire, et al. Abstract entitled "BoosTexter: A Boosting-Based System for Text Categorization," . Obtaining May 12, 2011 at website: http://citeseerx.ist.psu.edu/viewdoc/download?doi=10.1.1.33.1666&rep=rep1&type=pdf, 34 pgs.
Senior, et al., article entitled "Augmenting Conversational Dialogue by Means of Latent Semantic Googling,"—Published Date: Oct. 4-6, 2005, Trento, Italy. http://www.hml.queensu.ca/files/po265-senior.pdf, 7 pgs.
Sherwani, et al., article entitled "VoicePedia: Towards Speech-based Access to Unstructured Information,"—Published Date: 2007. http://www.cs.cmu.edu/~jsherwan/pubs/voicepedia.pdf, 4 pgs.
Siebra, et al., "SmartChat—An Intelligent Environment for Collaborative Discussions", In Proceedings of 7th International Conference on Intelligent Tutoring Systems, Aug. 30, 2004, pp. 883-885 (cited in EP Supp ISR).
Stegmann, et al., abstract entitled "Multimodal Interaction for Access to Media Content," Retrieved Date: Sep. 29, 2010. http://www.icin.biz/files/2008papers/Poster-08.pdf, 4 pgs.
Stephanie Seneff. Article entitled "TINA: A Natural Language System for Spoken Language Applications" Published in the 1992 Edition of Association for Computational Linguistics, vol. 18, No. 1, pp. 61-86; 26 pgs. Obtained at: http://citeseerx.ist.psu.edu/viewdoc/download?doi=10.1.1.75.1626&rep=rep1&type=pdf.
Taiwan Notice of Allowance Issued in Patent Application No. 101105673, dated Mar. 2, 2016, 4 pgs.
Taiwan Search Report Issued in Patent Application No. 101105673, dated Oct. 16, 2015, 9 pgs.
Technical Whitepaper entitled "Speak With Me, Inc." Retrieved Date: Sep. 24, 2010. http://www.speakwithme.com/files/pdf/whitepaper.pdf, 11 pgs.
Tomuro et al., article entitled "Personalized Search in Folksonomies with Ontological User Profiles," Retrieved Date: Sep. 30, 2010. http://facweb.cs.depaul.edu/noriko/papers/iis09.pdf, 14 pgs.
Tur, et al., "Model Adaptation for Dialog Act Tagging", In Proceedings of IEEE Spoken Language Technology Workshop, Dec. 10, 2006, 4 pgs.
Tur, et al., Abstract entitled "Semi-Supervised Learning for Spoken Language Understanding Using Semantic Role Labeling"—Published Date: 2005, pp. 232-237. Obtained at: http://ieeexplore.ieee.org/stamp/stamp.jsp?arnumber=01566523, 6 pgs.
Tur, et al., Abstract entitled "What is Left to be Understood in ATIS?" Published in the Proceedings of the IEEE SLT Workshop in Berkeley, CA., 2010 , 6 pgs.
Turunen et al. article entitled "Multimodal Interaction with Speech and Physical Touch Interface in a Media Center Application," Presented and Published Oct. 29-31, 2009 at Ace 2009 in Athens, Greece. http://delivery.acm.org/10.1145/1700000/1690392/p19-turunen.pdf?key1=1690392&key2=5824375821&coll=GUIDE&dl=GUIDE&CFID=103676711&CFTOKEN=24231502, 8 pgs.
U.S. Official Action dated Apr. 9, 2015, in U.S. Appl. No. 13/077,368, 8 pgs.
U.S. Official Action dated Aug. 1, 2013 in U.S. Appl. No. 13/076,862, 28 pgs.
U.S. Official Action dated Aug. 24, 2012, in U.S. Appl. No. 13/077,431, 15 pgs.
U.S. Official Action dated Dec. 24, 2013 in U.S. Appl. No. 13/592,638, 14 pgs.
U.S. Official Action dated Dec. 4, 2015 in U.S. Appl. No. 13/106,374, 54 pgs.
U.S. Official Action dated Dec. 4, 2015, in U.S. Appl. No. 13/077,396, 33 pgs.
U.S. Official Action dated Dec. 7, 2015, in U.S. Appl. No. 13/077,303, 19 pgs.
U.S. Official Action dated Feb. 24, 2014, in U.S. Appl. No. 13/077,396, 28 pgs.
U.S. Official Action dated Feb. 28, 2014, in U.S. Appl. No. 13/077,233, 31 pgs.
U.S. Official Action dated Jan. 14, 2016 in U.S. Appl. No. 13/076,862, 31 pgs.
U.S. Official Action dated Jan. 28, 2014, in U.S. Appl. No. 13/077,455, 15 pgs.
U.S. Official Action dated Jan. 7, 2014, in U.S. Appl. No. 13/077,303, 17 pgs.
U.S. Official Action dated Jul. 1, 2015 in U.S. Appl. No. 13/076,862, 32 pgs.
U.S. Official Action dated Jul. 10, 2014, in U.S. Appl. No. 13/077,303, 17 pgs.
U.S. Official Action dated Jul. 25, 2013 in U.S. Appl. No. 13/077,431 ,14 pgs.
U.S. Official Action dated Jun. 12, 2015, in U.S. Appl. No. 13/077,303, 21 pgs.
U.S. Official Action dated Jun. 26, 2014, in U.S. Appl. No. 13/077,455, 15 pgs.
U.S. Official Action dated Jun. 4, 2013, in U.S. Appl. No. 13/077,368, 7 pgs.
U.S. Official Action dated Jun. 4, 2015, in U.S. Appl. No. 13/077,396, 31 pgs.
U.S. Official Action dated Mar. 19, 2015, in U.S. Appl. No. 13/077,431, 15 pgs.
U.S. Official Action dated Mar. 20, 2014 in U.S. Appl. No. 13/076,862, 27 pgs.
U.S. Official Action dated Mar. 20, 2014, in U.S. Appl. No. 13/077,368, 8 pgs.
U.S. Official Action dated May 15, 2014 in U.S. Appl. No. 13/106,374, 28 pgs.
U.S. Official Action dated May 28, 2015 in U.S. Appl. No. 13/106,374, 40 pgs.
U.S. Official Action dated May 29, 2013, in U.S. Appl. No. 13/077,303, 15 pgs.
U.S. Official Action dated May 5, 2015, in U.S. Appl. No. 13/077,455, 10 pgs.
U.S. Official Action dated Nov. 19, 2014, in U.S. Appl. No. 13/077,396, 32 pgs.
U.S. Official Action dated Nov. 27, 2015, in U.S. Appl. No. 13/077,431, 15 pgs.
U.S. Official Action dated Nov. 3, 2014, in U.S. Appl. No. 13/077,303, 18 pgs.
U.S. Official Action dated Oct. 10, 2014, in U.S. Appl. No. 13/077,233, 34 pgs.
U.S. Official Action dated Oct. 2, 2014 in U.S. Appl. No. 13/106,374, 42 pgs.
U.S. Official Action dated Oct. 29, 2014, in U.S. Appl. No. 13/077,455, 17 pgs.
U.S. Official Action dated Sep. 15, 2014, in U.S. Appl. No. 13/077,368, 7 pgs.
U.S. Official Action dated Sep. 5, 2014, in U.S. Appl. No. 13/077,431, 15 pgs.

(56) References Cited

OTHER PUBLICATIONS

U.S. Appl. No. 13/077,233, Office Action dated Apr. 18, 2016, 36 pgs.
U.S. Appl. No. 13/077,303, Advisory Action dated Apr. 15, 2016, 3 pgs.
U.S. Appl. No. 13/077,303, Office Action dated May 3, 2016, 19 pgs.
U.S. Appl. No. 13/077,396, Office Action dated May 19, 2016, 36 pgs.
U.S. Appl. No. 13/106,374, Notice of Allowance dated May 13, 2016, 16 pgs.
U.S. Appl. No. 13/106,374, Notice of Allowance dated May 27, 2016, 2 pgs.
Vanderwende, et al. Abstract entitled "Microsoft Research at DUC2006: Task-Focused Summarization with Sentence Simplification and Lexical Expansion." Obtained on May 12, 2011 at website: http://citeseerxist.psu.edu/viewdoc/download?doi=10.1.1.114.2486&rep=rep1&type=pdf, 8 pgs.
Vickrey, et al. Abstract entitled "Sentence Simplification for Semantic Role Labeling." Obtained on May 12, 2011 at website: http://ai.stanford.edu/~dvickrey/underlying.pdf, 9 pgs.
Wang, et al, Article entitled "An Introduction to the Statistical Spoken Language Understanding"—Published in the IEEE Signal Processing Magazine, vol. 22, No. 5, pp. 16-31; 2005. http://research.microsoft.com/pubs/75236/2005-Wang-Deng-Acero-SPM.pdf.
Wang, et al., article entitled "Idea Expander: Agent-Augmented Online Brainstorming,"—Published Date: Feb. 6-10, 2010, Savannah, Georgia. http://research.microsoft.com/en-us/um/redmond/groups/connect/cscw_10/docs/p535.pdf, 2 pgs.
Ward, et al. Abstract entitled "Recent Improvements in the CMU Spoken Language Understanding System." Obtained on May 12, 2011 at website: http://www.aclweb.org/anthology/H/H94/H94-1039.pdf, 4 pgs.
Website: Fully automated conversation dialog systems, Published Date: Jun. 10, 2008, http://www.gyruslogic.com, 2 pgs.
Website: Siri: Your Personal Assistant for the Mobile Web—Published Date: Feb. 4, 2010. http://www.readwriteweb.com/archives/siri_your_personal_assistant_for_the_mobile_web.php,3 pgs.
Website: The Future of Voice Arrives—Published Date: Jan. 11, 2007. http://www.voicebox.com/technology,2 pgs.
Yaman, et al., Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214. http://research.microsoft.com/pubs/73918/sibel.pdf, 8 pgs.
Cao et al., "Integrating Word Relationships into Language Models," In Proceedings of 28th Annual International ACM SIGIR Conference on Research and Development in Information Retrieval, Aug. 15, 2005, 8 pgs.
Chinese Office Action in Application 201210101485.4, dated Feb. 20, 2017, 5 pgs.
Chinese Notice of Allowance in Application 201210093414.4, dated Feb. 9, 2017, 8 pgs.
Japanese Notice of Allowance in Application 2014-502718, dated Feb. 1, 2017, 3 pgs. (No English Translation.).
Tur, et al., "Sentence Simplification for Spoken Language Understanding", In Proceedings of International Conference on Acoustics, Speech and Signal Processing, May 22, 2011, 4 pgs.
U.S. Patent Application entitled Augmented Conversational Understanding Agent, having U.S. Appl. No. 13/076,862, filed Mar. 31, 2011.
U.S. Patent Application entitled "Augmented Conversational Understanding Architecture" having U.S. Appl. No. 13/077,431, filed Mar. 31, 2011.
U.S. Patent Application entitled "Combined Activation for Natural User Interface Systems" having U.S. Appl. No. 13/077,368, filed Mar. 31, 2011.
U.S. Patent Application entitled "Conversational Dialog Learning and Correction" having U.S. Appl. No. 13/077,233, filed Mar. 31, 2011.
U.S. Patent Application entitled "Location-Based Conversational Understanding" having U.S. Appl. No. 13/077,455, filed Mar. 31, 2011.
U.S. Patent Application entitled "Personalization of Queries, Conversations, and Searches" having U.S. Appl. No. 13/077,303, filed Mar. 31, 2011.
U.S. Patent Application entitled "Sentence Simplification for Spoken Language Understanding" having U.S. Appl. No. 13/106,374, filed May 12, 2011.
U.S. Patent Application entitled "Translating Natural Language Utterances to Keyword Search Queries" having U.S. Appl. No. 13/592,638, filed Aug. 23, 2012.
U.S. Patent Application entitled "Translating Natural Language Utterances to Keyword Search Queries" having U.S. Appl. No. 14/733,188, filed Jun. 8, 2015.
U.S. Restriction Requirement dated Nov. 2, 2012, in U.S. Appl. No. 13/077,368, 14 pgs.
U.S. Official Action dated Jun. 11, 2013, in U.S. Appl. No. 13/077,455, 14 pgs.
Chinese Notice of Allowance in Application 201210092263.0, dated Feb. 28, 2017, 4 pgs.
Chinese 2nd Office Action in Application 201210090349.X, dated Feb. 28, 2017, 9 pgs.
Chinese 2nd Office Action in Application 201210090634.1, dated Mar. 21, 2017, 9 pgs.
U.S. Appl. No. 13/076,862, Notice of Allowance dated May 3, 2017, 14 pgs.
U.S. Appl. No. 13/077,303, Ex-Parte Quayle Action mailed May 4, 2017, 6 pgs.
U.S. Appl. No. 14/989,974, Office Action dated Mar. 29, 2017, 16 pgs.
Chinese Notice of Allowance in Application 201210087420.9, dated May 4, 2017, 3 pgs.
U.S. Appl. No. 13/077,233, Appeal Brief filed Jun. 12, 2017, 32 pgs.
Chinese Notice of Allowance in Application 201210101485.4, dated Jun. 29, 2017, 4 pgs.
U.S. Appl. No. 13/077,396, Notice of Allowance dated Jul. 28, 2017, 25 pgs.
U.S. Appl. No. 13/077,431, Office Action dated Jul. 14, 2017, 15 pgs.
PCT 2nd Written Opinion in International Application PCT/US2016/050840, dated Jul. 24, 2017, 7 pgs.
U.S. Appl. No. 13/077,233, Examiner's Answer to the Appeal Brief dated Aug. 4, 2017, 13 pgs.
U.S. Appl. No. 13/077,303, Notice of Allowance dated Aug. 24, 2017, 7 pgs.
Chinese Decision on Rejection in Application 201210091176.3, dated Aug. 2, 2017, 11 pgs.
U.S. Appl. No. 14/989,974, Office Action dated Aug. 14, 2017, 20 pgs.
Chinese Notice of Allowance in Application 201210090349.X, dated Aug. 31, 2017, 4pgs.
U.S. Appl. No. 13/077,396, Notice of Allowance dated Aug. 30, 2017, 20 pgs.
U.S. Appl. No. 14/733,188, Office Action dated Sep. 18, 2017, 15 pgs.
U.S. Appl. No. 13/077,303, Notice of Allowance dated Sep. 18, 2017, 2 pgs.
U.S. Appl. No. 13/077,396, USPTO Response to 312 Amendment dated Nov. 9, 2017, 2 pgs.
U.S. Appl. No. 14/856,139, Office Action dated Nov. 9, 2017, 18 pgs.
Chinese 3rd Office Action in Application 201210090634.1, dated Oct. 31, 2017, 11 pages.
U.S. Appl. No. 14/989,974, Notice of Allowance dated Dec. 19, 2017, 8 pgs.
PCT International Preliminary Report on Patentability in International Application PCT/US2016/050840, dated Dec. 12, 2017, 9 pgs.
Chinese Office Action in Application 201210091176.3, dated Feb. 2, 2018, 5 pages.
U.S. Appl. No. 13/077,431, Office Action dated Jan. 29, 2018, 15 pages.

(56) References Cited

OTHER PUBLICATIONS

Japanese Notice of Allowance in Application 2017-038097, dated Feb. 5, 2018, 3 pages. (No English Translation.).
Korean Office Action in Application 10-2013-7025540, dated Jan. 30, 2018, 6 pages.
U.S. Appl. No. 14/989,974, Notice of Allowance dated Feb. 5, 2018, 5 pgs.
U.S. Appl. No. 15/271,859, Office Action dated Jan. 8, 2018, 44 pages.
Yasufumi Kaneko et al., Detecting Search Intention by Analyzing Relationship between Keywords with Relaxation Value and an Interface for Inputting Keywords, Jun. 27, 2008, Journal of DBSJ, the 7th volume, No. 1, p. 181-186 (No English Translation).
U.S. Appl. No. 14/989,974, Notice of Allowance dated Apr. 13, 2018, 5 pgs.
U.S. Appl. No. 14/733,188, Notice of Allowance dated Apr. 24, 2018, 7 pgs.
"Office Action Issued in Korean Patent Application No. 10-2013-7025578", dated May 17, 2018, 9 Pages.
"Office Action Issued in Korean Patent Application No. 10-2013-7025540", dated Jul. 13, 2018, 6 Pages.
"Office Action Issued in Korean Patent Application No. 1020137025586", dated May 21, 2018, 12 Pages.
"Non-Final Office Action Issued in U.S. Appl. No. 12/604,526", dated May 10, 2012, 21 Pages.
"Office Action Issued in European Patent Application No. 12763866.6", dated Jun. 27, 2018, 8 Pages.
"Office Action Issued in European Patent Application No. 12764494.6", dated Apr. 6, 2018, 6 Pages.
"Office Action Issued in European Patent Application No. 12764853.3", dated Jul. 12, 2018, 9 Pages.
"Office Action Issued in European Patent Application No. 12765100.8", dated Jul. 18, 2018, 10 Pages.
"Office Action Issued in European Patent Application No. 12765896.1", dated Aug. 20, 2018, 7 Pages.
"Office Action Issued in U.S. Appl. No. 13/077,431", dated May 22, 2018, 20 Pages.
"Office Action Issued in European Patent Application No. 13739555.4", dated Nov. 2, 2015, 6 Pages.
"Final Office Action Issued in U.S. Appl. No. 14/856,139", dated Jun. 21, 2018, 19 Pages.
"Final Office Action Issued in U.S. Appl. No. 15/271,859", dated Jul. 13, 2018, 63 Pages.
"Non Final Office Action Issued in U.S. Appl. No. 15/620,567", dated Jul. 13, 2018, 8 Pages.
Aggarwal, et al., "Human Motion analysis", In Proceedings of Computer Vision and Image Understanding, vol. No. 73, Issue No. 3, Mar. 1, 1999, 13 Pages.
Azarbayejani, et al, "Visually Controlled Graphics", In Proceedings of the IEEE Transactions on Pattern Analysis and Machine Intelligence, vol. 15, Issue 6, Jun. 1, 1993, 4 Pages.
Breen, et al., "Interactive Occlusion and Collusion of Real and Virtual Objects in Augmented Reality", In Journal European Computer Industry Research Center, Jan. 1995, 22 Pages.
Brody, "Body language user interface (BLUI)", In Proceedings of the Human Vision and Electronic Imaging III, vol. 3299, Jul. 17, 1998, pp. 400-410.
Brogan, et al., "Dynamically Simulated Characters in Virtual Environments", In Proceedings of the IEEE Computer Graphics and Applications, vol. 18, Issue 5, Sep. 1998, pp. 58-69.
Corominas, Aurora, "The Artist's Gesture. An Initial Approach to the Cinematic Representation of Vincent Van Gogh's Pictorial Practice", Retrieved from https://www.raco.cat/index.php/Formats/article/viewFile/256216/343206, 2001, 12 Pages.
Fisher, et al., "Virtual Environment Display System", In Proceedings of ACM Workshop on Interactive 3D Graphics, Jan. 1, 1998, 12 Pages.
Freeman, et al., "Television Control by Hand Gestures", In International Workshop on Automatic Face and Gesture Recognition, Jun. 26, 1994, 7 Pages.
Fukumoto, et al., "Finger-Pointer: Pointing Interface by Image Processing", In Journal Computers and Graphics, vol. 18, Issue 5, May 1994, pp. 633-642.
Gao, et al., "VS: Facial Sculpting in the Virtual World", In Proceedings of the International Conference on computational Intelligence for Modelling Control and Automation, Nov. 28, 2006, 6 Pages.
Granieri, et al., "Simulating Humans in VR", In the Proceeding of Center for Human Modeling and Simulation, Oct. 12, 1994, 15 Pages.
Hauptmann, Alexander G., "Speech and Gestures for Graphic Image Manipulation", In Proceedings of the SIGCHI Conference on Human Factors in Computing Systems, Mar. 1, 1989, pp. 241-245.
Qian, et al., "A Gesture-Driven Multimodal Interactive Dance System", in International Conference of IEEE on Multimedia and Expo (ICME), Voume 03, Jun. 30, 2004, pp. 1579-1582.
Shivappa, et al., "Person Tracking With Audio-visual Cues Using Iterative Decoding Framework", In Proceedings of the 5th International Conference on Advanced Video and Signal Based Surveillance, Sep. 1, 2008, pp. 260-267.
Sonntag, et al., "SmartWeb Handheld—Multimodal Interaction with Ontological Knowledge Bases and Semantic Web Services", In the Proceeding of Artificial Intelligence for Human Computing, 2007, 8 Pages.
Zhao, Liang, "Dressed Human Modeling, Detection, and Parts Localization", In the Doctoral Dissertation in the Robotics Institute, Carnegie Mellon University, Pittsburgh, PA, Jul. 2001, 121 Pages.
"First Office Action and Search Report Issued in Chinese Patent Application No. 201610801496.1", dated Mar. 6, 2019, 16 Pages.
"Final Office Action Issued in U.S. Appl. No. 15/271,859", dated Apr. 12, 2019, 53 Pages.
"Summons to Attend Oral Proceedings issued in European Patent Application No. 12764853.3", Mailed Date: Apr. 2, 2019, 10 Pages.
"Summons to Attend Oral Proceedings issued in European Patent Application No. 12765100.8", Mailed Date: Apr. 2, 2019, 11 Pages.
"Office Action Issued in Korean Patent Application No. 1020137/025578", dated Nov. 30, 2018, 4 Pages.
"Non Final Office Action Issued in U.S. Appl. No. 14/856,139", dated Dec. 10, 2018, 13 Pages.
"Non Final Office Action Issued in U.S. Appl. No. 15/271,859", dated Nov. 29, 2018, 49 Pages.
"Office Action Issued in European Patent Application No. 12763913.6", dated Jan. 14, 2019, 8 Pages.
"Summons to Attend Oral Proceedings Issued in European Patent Application No. 12763866.6", Mailed Date: May 9, 2019, 7 Pages.
"Non Final Office Action Issued in U.S. Appl. No. 13/077,431", dated Aug. 7, 2019, 13 Pages.
"Second Office Action Issued in Chinese Patent Application No. 2016108014961", dated Sep. 12, 2019, 5 Pages.
"Siri—The Personal Assistant on your Phone", Retrieved From: https://www.youtube.com/watch?v=MpjpVAB06O4, Feb. 4, 2010, 4 Pages.
"Final Office Action Issued in U.S. Appl. No. 14/856,139", dated Jul. 1, 2019, 16 Pages.
"Summons to Attend Oral Proceedings Issued in European Patent Application No. 12764494.6", dated Aug. 7, 2019, 12 Pages.
"Summons to Attend Oral Proceedings Issued in European Patent Application No. 12764494.6", Mailed Date: Aug. 7, 2019, 12 Pages.
"Summon to Attend Oral Proceedings Issued in European Patent Application No. 12763913.6", dated Nov. 19, 2019, 5 Pages.

* cited by examiner

TASK DRIVEN USER INTENTS

RELATED APPLICATIONS

This patent application is a continuation of U.S. patent application Ser. No. 13/077,396, filed Mar. 31, 2011, now U.S. Pat. No. 9,842,168, which is incorporated herein in its entirety.

This patent application is also related to U.S. patent application Ser. No. 13/076,862, filed Mar. 31, 2011, and entitled "Augmented Conversational Understanding Agent," U.S. patent application Ser. No. 13/077,233, filed Mar. 31, 2011, and entitled "Conversational Dialog Learning and Correction," U.S. patent application Ser. No. 13/077,303, filed Mar. 31, 2011, and entitled "Personalization of Queries, Conversations, and Searches," U.S. patent application Ser. No. 13/077,368, filed Mar. 31, 2011, and entitled "Combined Activation for Natural User Interface Systems," U.S. patent application Ser. No. 13/077,431, filed Mar. 31, 2011, and entitled "Augmented Conversational Understanding Architecture," U.S. patent application Ser. No. 13/077,455, filed Mar. 31, 2011, and entitled "Location-Based Conversational Understanding," which are assigned to the same assignee as the present application and expressly incorporated herein, in their entirety, by reference.

BACKGROUND

Task driven user intents may provide a mechanism for facilitating natural language understanding of user queries and conversations. In some situations, web and/or cloud-based network services may offer a wide array of information to users, but a search agent may not be able to understand a user's context to choose which service to query. For example, a natural language phrase of "let's do Italian tonight" may not be understood by a search engine, which may return results associated with translating the phrase into Italian rather than searching for an Italian restaurant. Thus, conventional systems require specific syntax to define a search domain rather than being able to identify that domain from the context of the search.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Identification of user intents may be provided. A plurality of network applications may be identified, and an ontology associated with each of the plurality of applications may be defined. If a phrase received from a user is associated with at least one of the defined ontologies, an action associated with the network application may be executed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
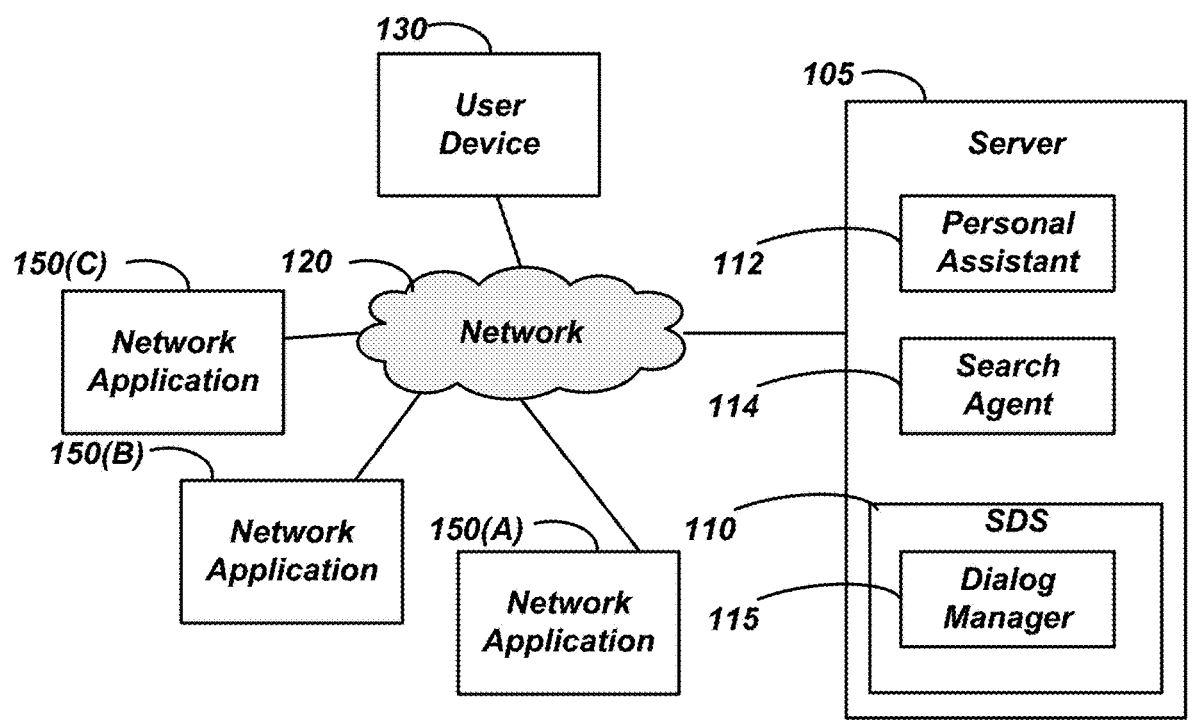
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Spoken dialog systems (SDS) enable people to interact with computers with their voice. The primary component that drives the SDS may comprise a dialog manager: this component manages the dialog-based conversation with the user. The dialog manager may determine the intention of the user through a combination of multiple sources of input, such as speech recognition and natural language understanding component outputs, context from the prior dialog turns, user context, and/or semantic concepts and data associated with an ontology. After determining the intention, the dialog manager may take an action, such as displaying the final results to the user and/or continuing in a dialog with the user to satisfy their intent.

FIG. 1 is a block diagram of an operating environment 100 comprising a server 105 comprising a spoken dialog system (SDS) 110. Server 105 may comprise software applications such as a personal assistant program 112 and/or a search agent 114. SDS 110 may comprise a dialog manager 115 and may be operative to receive user phrases, queries, and/or action requests via a network 120. Network 120 may comprise a private network (e.g., a corporate intranet), a cellular network, and/or a public network such as the Internet. Operating environment 100 may further comprise a plurality of network applications 150(A)-(C). Network applications 150(A)-(C) may comprise data sources, such as a stock market quote service and/or a weather data service, and/or web services such as a restaurant reservation tool.

Figure 2:
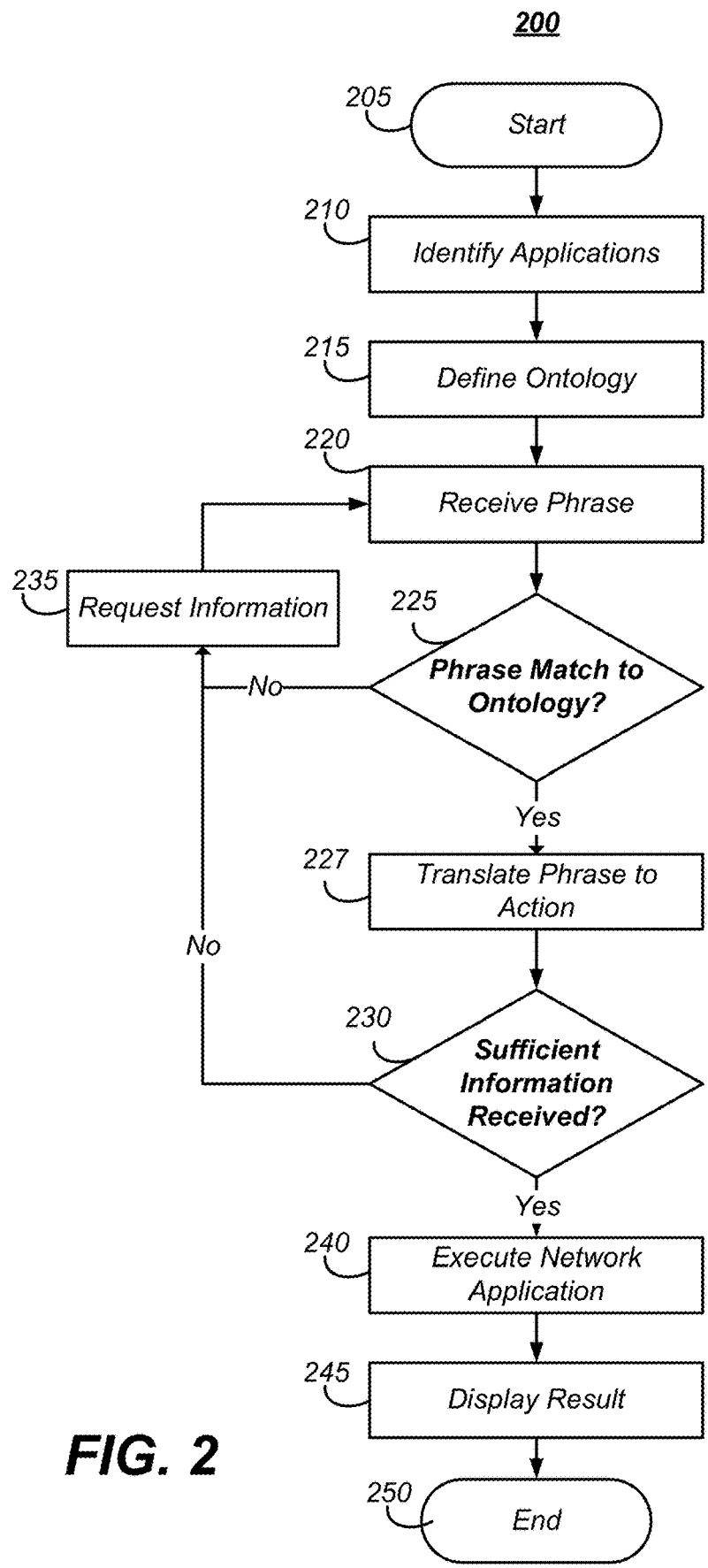
FIG. 2 is a flow chart of a method for providing an understanding of user intents.

FIG. 2 is a flow chart setting forth the general stages involved in a method 200 consistent with an embodiment of the invention for providing understanding of user intents. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may identify a plurality of network applications. For example, SDS 110 may parse web pages provided by each of plurality of network applications 150(A)-(C). Those web pages may comprise publically accessible APIs that may be called by a remote process, such as search agent 114. Such APIs may comprise functional definitions within the web page that may identify required parameters in order to successfully call the API. For another example, application-specific ontologies may be provided by the network applications.

Method 200 may then advance to stage 215 where computing device 300 may receive and/or define an ontology for each of the identified applications. For example, SDS 110 may receive a "restaurant" ontology for a restaurant rating website such as Zagat® or reservation site OpenTable®. Similarly, a "travel" ontology may be defined for a travel booking website such as Expedia®. Each identified application, it's associated ontology, and any required parameters may then be stored in a database associated with SDS 110.

Method 200 may then advance to stage 220 where computing device 300 may receive a phrase from a user. For example, a user may speak into a cellular phone comprising user device 130 and say "let's get dinner tonight."

Method 200 may then advance to stage 225 where computing device 300 may determine whether the phrase is associated with one of the defined ontologies. For example, "dinner" may comprise a keyword associated with a "restaurant" ontology. Consistent with embodiments of the invention, the ontology associated with the application may comprise a shared ontology that may be merged with a personal ontology of the user. The received phrase may be compared to semantic concepts associated with the merged ontology (and/or multiple merged ontologies) to identify an intent of the received phrase.

If an associated semantic concept is identified, method 200 may advance to stage 227 where computing device 300 may translate the phrase into an agent action associated with at least one of the plurality of network-based applications according to the merged ontology. For example, the received phrase "let's get dinner tonight" may be translated into a search action for nearby restaurants with reservations available tonight.

Method 200 may then advance to stage 230 where computing device 300 may determine whether the required parameters were received. For example, to perform a search on a restaurant reservation network service, a time-frame may be required. The concept "tonight" may be translated into the required time-frame for the associated application.

If no ontology is matched at stage 225, or if required parameters are not found at stage 230, method 200 may advance to stage 235 where computing device 300 may request more information. For example, personal assistant program 112 may ask the user for the required information via a voice prompt and/or a display on user device 130.

If the required parameters are found at stage 230, method 200 may advance to stage 240 where computing device 300 may execute the translated action on the associated application. For example, server 105 may execute a remote procedure call to network application 150(A) using the required parameters from the user phrase.

Method 200 may then advance to stage 245 where computing device 300 may display a result to the user. For example, server 105 may receive a result associated with the executed action from network application 150(A). This result may then be transmitted to user device 130 for display on a screen and/or for being output via audio (e.g., text-to-speech). Method 200 may then end at stage 250.

An embodiment consistent with the invention may comprise a system for providing identification of a user intent. The system may comprise a memory storage and a processing unit coupled to the memory storage. The processing unit may be operative to identify a plurality of applications define a domain associated with each of the plurality of applications, receive a phrase from a user, and determine whether the phrase is associated with at least one domain associated with at least one of the applications. In response to determining that the phrase comprises the context associated with the at least one domain associated with the at least one of the applications, the processing unit may be operative to perform a call to the at least one of the applications according to the phrase. Each application may be associated with a network resource, such as a search function of a web page. Some and/or all of the applications may comprise a set of related application programming interfaces (APIs). For example, the set of APIs may be associated with different functions available at a web page.

The processing unit may be further operative to display a result associated with performing the call to the at least one of the applications according to the phrase, determine whether a second phrase has been received from the user, and, if so, determine whether the second phrase is associated with the same application. In response to determining that the second phrase is associated with the same application, the processing unit may be operative to perform a second call to the at least one of the set of related APIs according to the second phrase and display a result associated with the second call.

Another embodiment consistent with the invention may comprise a system for providing identification of a user intent. The system may comprise a memory storage and a processing unit coupled to the memory storage. The processing unit may be operative to receive a phrase from a user, parse the phrase into a plurality of words, identify a domain associated with the phrase according to the plurality of words, determine whether at least one of a plurality of applications is associated with the identified domain, and, if so, prepare a call to execute an action associated with the application using at least one of the plurality of words as a parameter of the call. The processing unit may be further operative to receive a second phrase, parse the phrase into a second plurality of words, determine whether the second phrase is associated with the domain, and, if so, update the agent action associated with the application with at least one of the plurality of second words comprising a second parameter of the call. The second phrase may be received from the same user and/or a second user, such as when two users are involved in a conversation. In response to determining that the second phrase is not associated with the domain, the processing unit may execute the call to the at least one of the plurality of APIs, receive a response associated with the executed call to the at least one of the plurality of APIs, and display the received response to the user. Consistent with embodiments of the invention, the domain associated with the phrase may comprise, for example, a work domain, a restaurant domain, a calendaring domain, a travel domain, an entertainment domain, and a map domain.

Yet another embodiment consistent with the invention may comprise a system for providing identification of a user intent. The system may comprise a memory storage and a processing unit coupled to the memory storage. The processing unit may be operative to identify a plurality of applications, define an ontology associated with each of the plurality of applications, receive a first phrase from a user, and determine whether the phrase is associated with at least one ontology associated with at least one of the plurality of applications. Each of the plurality of applications may comprise at least one required parameter. In response to determining that the phrase is associated with the at least one ontology, the processing unit may be operative to merge the defined ontology with a second ontology associated with the user, translate the first phrase into an agent action associated with at least one of the plurality of network-based applications according to the merged ontology, and determine whether the phrase comprises sufficient information to execute the agent action (e.g., the at least one required parameter associated with the at least one of the plurality of applications). If so, the processing unit may be operative to execute the agent action, such as by performing a call comprising the at least one required parameter to the network application associated, and display a result associated with executing the agent action.

Figure 3:
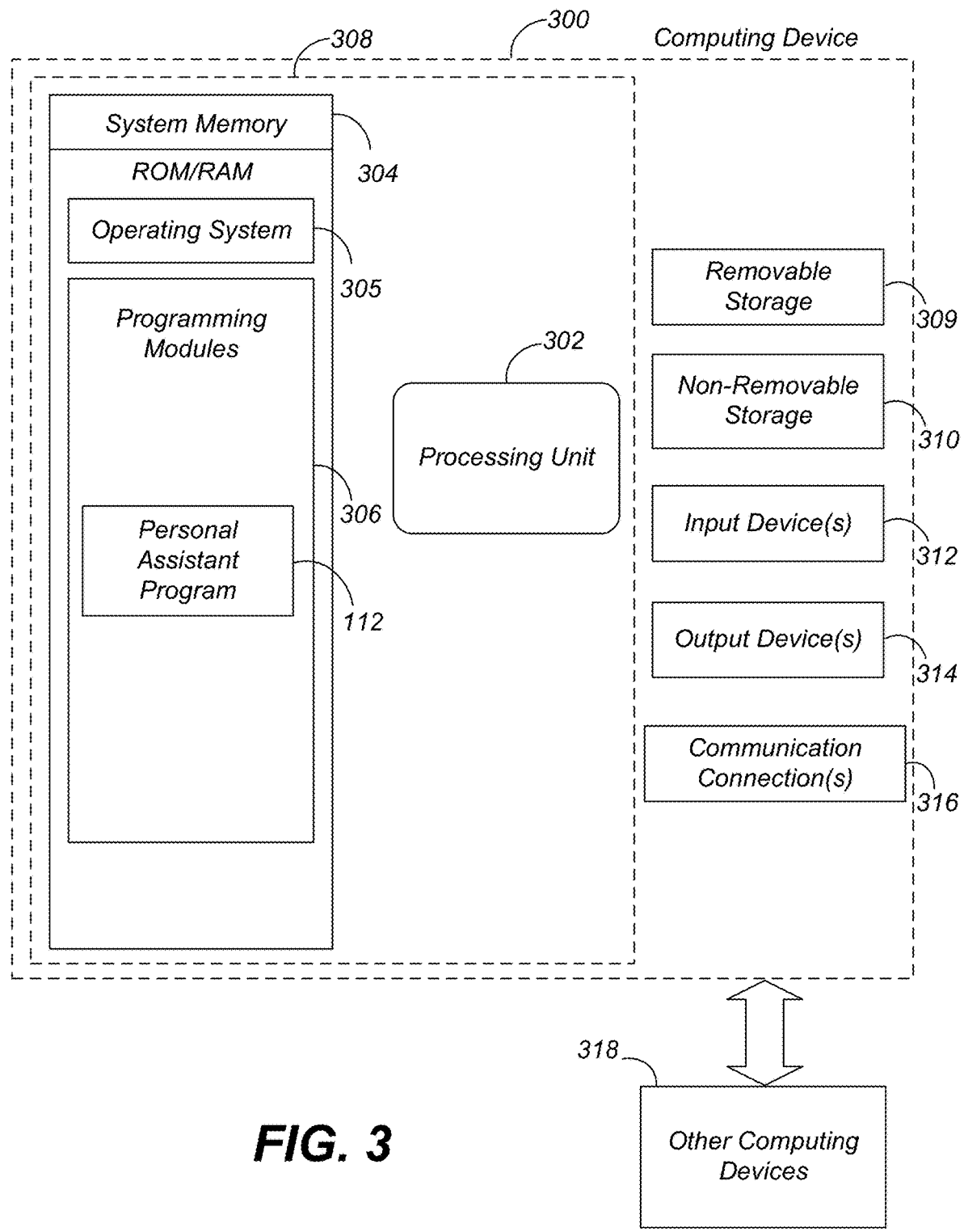
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g., random access memory (RAM)), non-volatile (e.g., read-only memory (ROM)), flash memory, or any combination. System memory 304 may include operating system 305, one or more programming modules 306, and may include personal assistant program 112. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an Intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g., personal assistant program 112) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a user intent identification, comprising:
    identifying a plurality of network-based applications;
    generating an ontology associated with each of the plurality of network-based applications;
    receiving, at a personal digital assistant, a single natural language phrase from a user;
    comparing the single natural language phrase to one or more keywords associated with at least one ontology to automatically determine whether the single natural language phrase is associated with the at least one ontology associated with at least one of the network-based applications;
    determining an intent of the single natural language phrase by identifying at least one intent keyword in the single natural language phrase;
    determining a context of the single natural language phrase using one or more context keywords in the single natural language phrase; and
    causing the personal digital assistant to automatically select and execute an agent action associated with the at least one of the plurality of network-based applications, the agent action being based, at least in part, on the determined intent and the determined context in the single natural language phrase.

2. The method of claim 1, further comprising determining whether the keyword is included in the natural language phrase.

3. The method of claim 1, further comprising determining one or more parameters for the agent action based, at least in part, on the natural language phrase.

4. The method of claim 1, further comprising requesting additional information when it is determined the natural language phrase is not associated with the at least one ontology.

5. The method of claim 1, wherein causing the personal digital assistant to execute an agent action comprises causing the personal digital assistant to execute an action specific to the at least one of the plurality of network-based applications.

6. A computing device, comprising:
    at least one processor; and
    a memory coupled to the at least one processor and storing instructions that, when executed by the at least one processor, perform a method, comprising:
    identifying a plurality of network-based applications;
    generating an ontology associated with each of the plurality of network-based applications;
    receiving a single natural language phrase;
    comparing the single natural language phrase to one or more keywords associated with at least one ontology to automatically determine whether the single natural language phrase is associated with at the least one ontology associated with at least one of the applications;

determining an intent of the single natural language phrase by identifying at least one intent keyword in the single natural language phrase;

determining a context of the single natural language phrase using one or more context keywords in the single natural language phrase; and causing a personal digital assistant associated with the computing device to automatically select and execute an agent action associated with the at least one of the plurality of network-based applications, the agent action being based, at least in part, on the determined intent and the determined context.

7. The computing device of claim 6, further comprising instructions for determining whether the keyword is included in the natural language phrase.

8. The computing device of claim 6, further comprising instructions for determining one or more parameters for the agent action based, at least in part, on the natural language phrase.

9. The computing device of claim 6, further comprising instructions for requesting additional information when it is determined that the natural language phrase is not associated with the at least one ontology.

10. The computing device of claim 6, wherein causing the personal digital assistant to execute an agent action comprises causing the personal digital assistant to execute an action specific to the at least one of the plurality of network-based applications.

11. The computing device of claim 6, further comprising instructions for providing at least one of the agent action and a result of the agent action on a display of the computing device.

12. A method, comprising:

identifying a plurality of network-based applications;

generating an ontology associated with each of the plurality of network-based applications;

causing a personal digital assistant associated with a computing device to receive a single natural language sentence;

comparing the single natural language sentence to one or more keywords associated with at least one ontology to determine that the single natural language sentence is associated with the at least one ontology;

determining an intent of the natural language sentence and a context associated with the natural language sentence; and causing the personal digital assistant to automatically select and execute an agent action associated with the at least one of the plurality of network-based applications, the agent action being based, at least in part, on the determined intent and the determined context of the single natural language sentence.

13. The method of claim 12, further comprising causing a display of a result of the agent action on a display of the computing device.

14. The method of claim 12, wherein the one or more keywords of the at least one ontology are obtained from parsing content associated with each of the plurality of network-based applications.

15. The method of claim 1, wherein the one or more keywords are obtained from parsing content associated with each of the plurality of network-based applications.

16. The computing device of claim 6, wherein the one or more keywords are obtained from parsing content associated with each of the plurality of network-based applications.

17. The method of claim 1, further comprising causing a display of a result of the agent action on a display of a computing device.

18. The method of claim 1, wherein the personal digital assistant automatically selects and executes the agent action in response to determining the single natural language phrase is associated with the at least one ontology.

19. The method of claim 12, further comprising requesting additional information when it is determined that the natural language sentence is not associated with the at least one ontology.

20. The method of claim 12, wherein the one or more keywords are obtained from parsing content associated with each of the plurality of network-based applications.

* * * * *